United States Patent
Bondioli

(10) Patent No.: US 10,495,192 B2
(45) Date of Patent: Dec. 3, 2019

(54) SYSTEM COMPRISING A MIXER-WAGON, FOR MIXING AND DISTRIBUTING FODDER, AND A MECHANICAL POWER TRANSMISSION UNIT FOR ACTUATING THE MIXER-WAGON

(71) Applicant: Edi Bondioli, Suzzara (IT)

(72) Inventor: Edi Bondioli, Suzzara (IT)

( * ) Notice: Subject to any disclaimer, the term of this patent is extended or adjusted under 35 U.S.C. 154(b) by 51 days.

(21) Appl. No.: 15/371,727

(22) Filed: Dec. 7, 2016

(65) Prior Publication Data

US 2017/0167580 A1    Jun. 15, 2017

(30) Foreign Application Priority Data

Dec. 10, 2015 (IT) .......... 102015000081676

(51) Int. Cl.
- *F16H 3/72* (2006.01)
- *F16H 47/04* (2006.01)
- *A01K 5/00* (2006.01)

(52) U.S. Cl.
CPC .......... *F16H 3/72* (2013.01); *A01K 5/004* (2013.01); *F16H 47/04* (2013.01)

(58) Field of Classification Search
CPC .......... A01K 5/002; A01K 5/004; A01K 5/00; F16H 3/72; F16H 3/724; F16H 3/725; F16H 61/4165; F16H 61/4183; F16H 61/40; F16H 39/02; F16H 39/04; A01B 33/08; A01B 33/082; A01B 33/085; A01D 69/06
USPC ...... 475/72–82; 172/2, 3, 74, 317–321, 492, 172/493; 366/319, 297, 190, 266; 241/108.8, 260.1; 406/38–44; 222/626, 222/627

See application file for complete search history.

(56) References Cited

U.S. PATENT DOCUMENTS

| | | | | |
|---|---|---|---|---|
| 6,042,496 A | * | 3/2000 | Lehle | F16H 47/04 475/72 |
| 7,341,372 B2 | * | 3/2008 | Van Der Plas | A01K 5/004 366/141 |
| 8,657,485 B2 | * | 2/2014 | Neier | A01K 5/004 366/297 |
| 9,010,991 B2 | * | 4/2015 | Mcfarlane | B01F 7/085 366/270 |
| 9,695,575 B2 | * | 7/2017 | Miyamoto | E02F 9/2079 |
| 2003/0008745 A1 | | 1/2003 | Heindl | |
| 2006/0256647 A1 | * | 11/2006 | Van Der Plas | A01K 5/004 366/141 |
| 2009/0238032 A1 | * | 9/2009 | Mcfarlane | B01F 7/085 366/270 |
| 2011/0031053 A1 | * | 2/2011 | Carl | B60K 17/08 180/165 |

(Continued)

FOREIGN PATENT DOCUMENTS

DE    10 78 399 B    3/1960
DE    11 69 792 B    5/1964

(Continued)

*Primary Examiner* — Jeffrey A Shapiro
(74) *Attorney, Agent, or Firm* — McGlew and Tuttle, P.C.

(57) ABSTRACT

A system is described comprising a mixer-wagon and a mechanical power transmission unit to actuate the rotating members of the mixer-wagon; the transmission unit comprises a box, a first shaft accessible from the outside of the box and a second shaft accessible from the outside of the box. The first shaft and the second shaft are coupled by means of an epicyclical gear train.

23 Claims, 6 Drawing Sheets

(56) References Cited

U.S. PATENT DOCUMENTS

| | | | | |
|---|---|---|---|---|
| 2012/0008457 A1* | 1/2012 | Neier | ............... | A01K 5/004 |
| | | | | 366/190 |
| 2013/0121805 A1* | 5/2013 | Carl | ............... | F16H 47/04 |
| | | | | 415/1 |
| 2015/0226314 A1* | 8/2015 | Liet | ............... | F16H 57/0416 |
| | | | | 366/145 |
| 2015/0292610 A1* | 10/2015 | Rintoo | ............... | F16H 3/728 |
| | | | | 475/72 |
| 2016/0130786 A1* | 5/2016 | Miyamoto | ............... | E02F 9/2079 |
| | | | | 701/50 |

FOREIGN PATENT DOCUMENTS

| | | | | |
|---|---|---|---|---|
| EP | 0 880 890 A1 | 12/1998 | | |
| EP | 003162199 A1 * | 3/2017 | ............ | F16H 63/30 |
| WO | WO-9315337 A1 * | 8/1993 | ............ | F16H 47/04 |

* cited by examiner

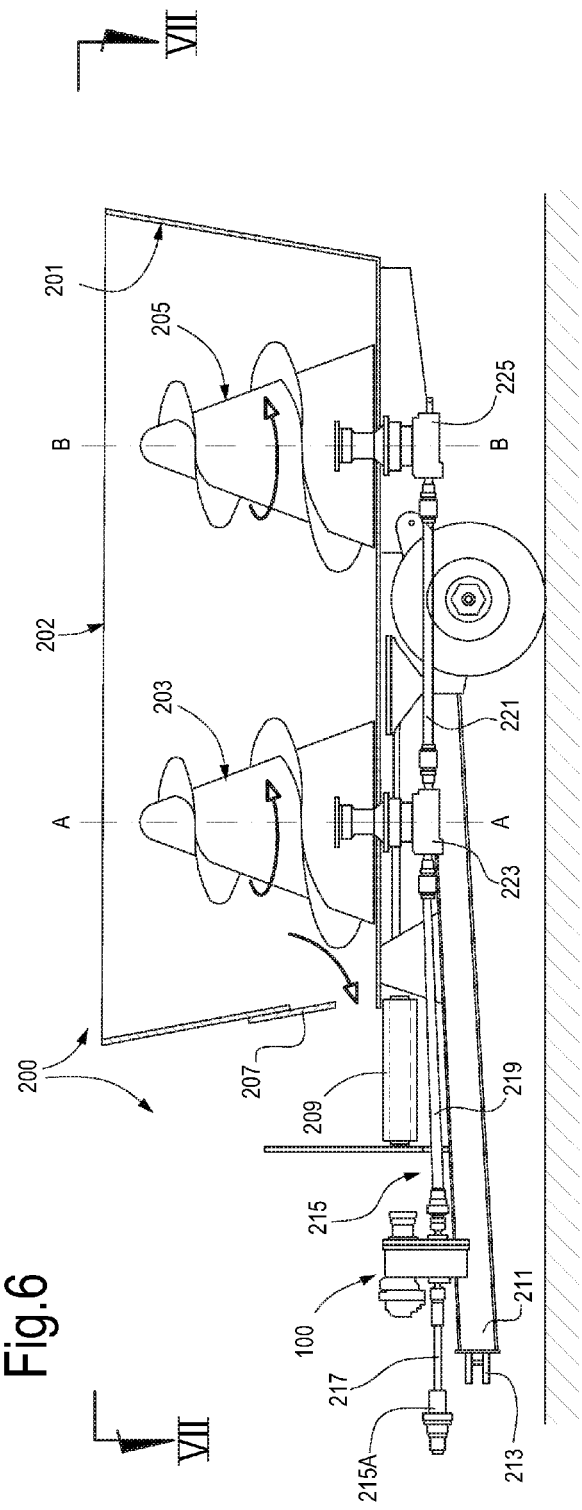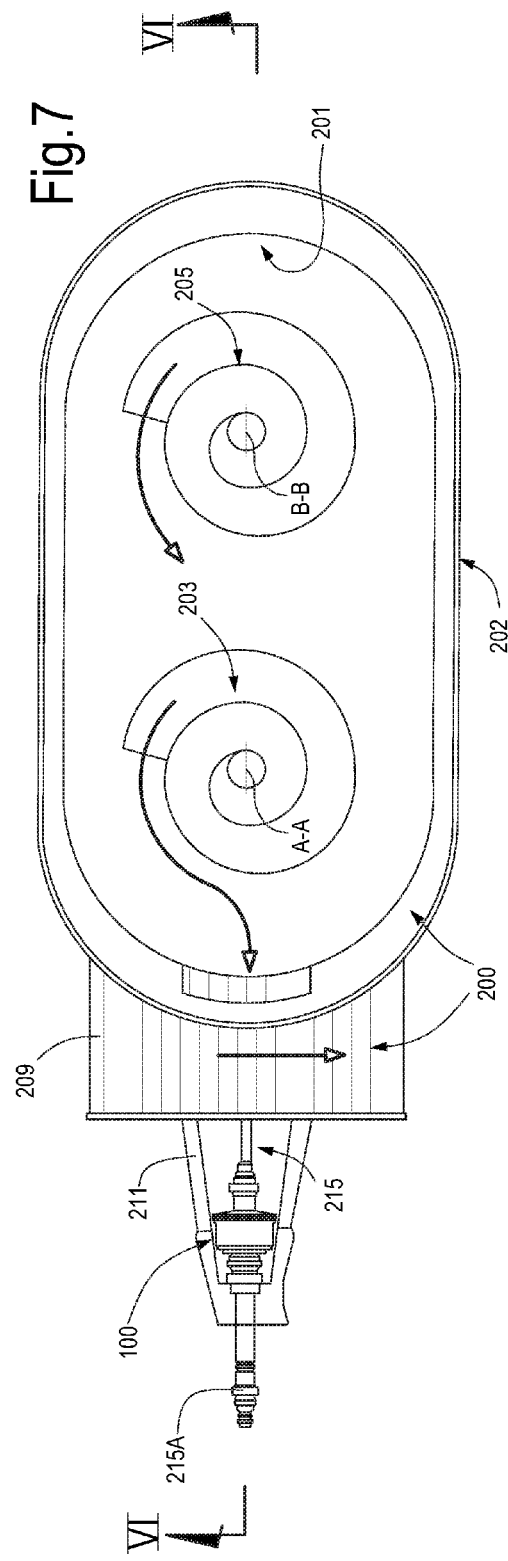

SYSTEM COMPRISING A MIXER-WAGON, FOR MIXING AND DISTRIBUTING FODDER, AND A MECHANICAL POWER TRANSMISSION UNIT FOR ACTUATING THE MIXER-WAGON

TECHNICAL FIELD

The present invention relates to improvements to systems for actuating mixer-wagons for mixing and distributing fodder. More particularly, the present invention relates to improvements to a mechanical power transmission unit to transmit motion from a drive shaft, connected to a power source, to driven shaft of the mixer-wagon.

STATE OF THE ART

In many mechanical applications, for instance in some agricultural machines, it is necessary to transmit motion between a drive shaft and a driven shaft, and in some cases the motion transmission ratio shall be variable. In so-called mixer-wagons, or silage cutters, or total mixed ration wagons, particular problems occur in the mechanical power transmission with variable number of revolutions. The mixer-wagons are used for preparing and distributing fodder for ruminant farm animals. The mixer-wagons can be self-propelled or towed. The towed mixer-wagon is coupled to a tractor, through which it is moved from the area where the fodder is loaded to the area where the fodder is distributed to the animals.

The mixer-wagon comprises, in combination: a tank, where the fodder is loaded and mixed, one or more mixing augers arranged inside the tank, a door for opening the tank and allowing the fodder unload, and a conveyor system, for instance a conveyor belt, for distributing the fodder directly in the mangers. The augers may have vertical or horizontal axis.

The operation of the mixer-wagon is subdivided into three steps:
  the step of loading and mixing fodder inside the tank;
  the step of moving, required to achieve the cowshed;
  the step of distributing fodder to the animals.

For every step, the auger speed shall be adapted to the type and quantity of mixed product. Moreover, the work speeds during the three steps are significantly different from one another. The speed required for the unloading step is almost twice the speed for the mixing step.

More particularly, during the loading and mixing step the mixer-wagon is loaded with different products and fodders of different sizes and consistencies, thus requiring different mixing speeds. Sometimes higher speed is required to chop the loaded material (for example when a bale of hay is put in the mixing tank), while sometimes lower mixing speed is required for having a more homogeneous product. Once the fodder has been loaded an mixed, the mixer-wagon shall be moved towards the distribution area, typically a cowshed. During the moving step, a slow mixing speed is required in order to avoid the material contained in the tank conglomerating, otherwise, the subsequent restart of the augers when the tank is full could be critical due to the high torque peaks generated in the mechanical transmission.

During the distribution step, the mixer-wagon moves along the cowshed, distributing fodder in the mangers in front of the animals. In this step, fodder shall be distributed uniformly along the manger, in order to have the same amount of fodder in front of each animal.

The tank empties through the discharge door due to centrifugal force. In order to have a uniform distribution without the need for continuously adjusting the tractor speed, it is necessary to have a constant material flow, and it is therefore necessary to increase the auger speed as the material quantity in the tank decreases.

Currently, in order to activate the augers the mixer-wagons are provided with a mechanical transmission taking power from the power take-off of the tractor and comprising the following components:
  one or more cardan shafts to connect the mixer-wagon to the tractor power take-off and to transmit power to the augers;
  a two- or three-speed gear box to vary the speed of the augers in the various work steps;
  an actuating box for each auger.

Currently, various solutions are marketed based on two-speed mechanical gear boxes, requiring to interrupt power transmission in order to engage a gear. These mechanical gear boxes have some disadvantages in the various steps. In particular, during chopping it is possible to adjust the work speed only by changing the rotation speed of the tractor endothermic engine, with consequent inefficiencies as regards the fuel consumption. During the moving step, the mixing augers are still as there is not a gear allowing a low speed. Anyway, independently of the moving step, before or during the distribution step the power transmission shall be interrupted, thus stopping the rotation of the members of the mixer-wagon to engage the high-speed gear. The complete shutdown of the mixer-wagon members makes the restart critical. In fact, the mixer-wagon is now full of fodder that, during the steps when the augers are still, could have formed a conglomerate mass. Under these conditions, very high torque peaks are generated during high-speed start-up, that are dangerous for all components of the mechanical transmission of the mixer-wagon.

Torque peaks often cause the activation of the torque limiters provided to protect the mechanical transmission of the mixer-wagon. The torque limiters protect against breakages, but their intervention entails time waste and inefficiencies.

Transmissions are also known, provided with power-shift or shift-tronic boxes, allowing to engage gear without interrupting power transmission. However, also these known arrangements are limited to only two or three discrete work speeds, and therefore it is necessary to vary the speed of the endothermic engine of the tractor to adequate the speed of the augers to the different conditions of the material.

There is therefore a need for developing a system comprising a mixer-wagon for preparing and distributing fodder combined with a mechanical power transmission unit that completely or partially overcomes one or more of the drawbacks of the prior art.

SUMMARY OF THE INVENTION

In order to solve or alleviate one or more drawbacks of the prior art, a mechanical power transmission unit is provided, comprising a box having a first shaft and a second shaft, both the shafts being accessible from the outside of the box in order to be coupled to a power source and to a load, for instance a towed machine. The first and the second shaft are mechanically coupled by means of an epicyclical gear train arranged therebetween. An auxiliary motion source allows to act on one of the gears of the epicyclical gear train in order to modify the transmission ratio between the first shaft and the second shaft.

Thanks to the possibility of acting on the epicyclical gear train through the auxiliary motion source, it is possible to control optimally the transmission ratio, for example to quickly pass from one to another operating condition and without the need for stops. It is also possible to have advantages as regards the operation of the power source coupled to the drive shaft of the mechanical power transmission unit, as this source (for instance an internal-combustion engine) can operate in conditions of maximum efficiency at constant number of revolutions, while acting through the auxiliary motion source on the epicyclical gear train, in order to have the right rotation speed on the output shaft, if necessary a rotation speed that is variable according to the load applied to the mechanical power transmission unit.

In advantageous embodiments, the first shaft and the second shaft are coaxial. In this way, the configuration is particularly compact.

As it will be clearly apparent from the description below of some embodiments, the first shaft may be an input shaft and the second shaft may be an output shaft, or vice versa, so that the mechanical transmission unit may be used as a reduction gear or as a multiplier.

According to advantageous embodiments, the epicyclical gear train comprises a ring gear with inner toothing, a sun gear coaxial with the ring gear, at least one planet gear, constituted by a toothed wheel engaging the ring gear and the sun gear and rotatingly supported by a planet-carrier which rotates around the axis of the sun gear and of the ring gear. Advantageously, the ring gear may be torsionally constrained to and coaxial with the first shaft. Advantageously, the planet-carrier may be torsionally constrained to and coaxial with the second shaft.

The motion source may be mechanically coupled to the sun gear of the epicyclical gear train configured in this way, so that, by driving the sun gear into rotation at controlled speed, the transmission ratio between the first shaft and the second shaft may be modified within the limits allowed by the work speed range of the motion source.

In advantageous embodiments, in order to have a particularly compact mechanical power transmission unit, the second shaft, to which the planet-carrier is torsionally coupled, extends inside the sun gear, and the planet carrier is arranged between the sun gear and the first shaft. In this way, it is possible to obtain a mechanical power transmission unit with a reduced number of toothed wheels, and therefore high efficiency, with a reduction in mechanical losses and therefore a lower heat generation than the mechanical transmission units of the prior art.

The motion source may be part of a hydrostatic transmission. The motion source may be, for example, a hydraulic motor. In advantageous embodiments, the hydraulic motor can be actuated by means of a pump directly moved by means of anyone of said first shaft and second shaft of the mechanical power transmission unit, and, more particularly, preferably by means of the shaft acting as drive shaft. In this way it is possible to better control the transmission ratio, keeping the power source, for example an endothermic engine to which the drive shaft of the mechanical power transmission unit is coupled, at a stationary speed.

BRIEF DESCRIPTION OF THE DRAWINGS

The attached drawings show non-limiting embodiments of the invention. More in particular:

FIG. 6 is a cross-section according to line VI-VI of FIG. 7 of a system comprising a mixer-wagon combined with a mechanical power transmission unit as illustrated in FIGS. 1-5;

FIG. 7 is a plan view according to line VII-VII of FIG. 6.

DETAILED DESCRIPTION OF EMBODIMENTS

Figure 1:
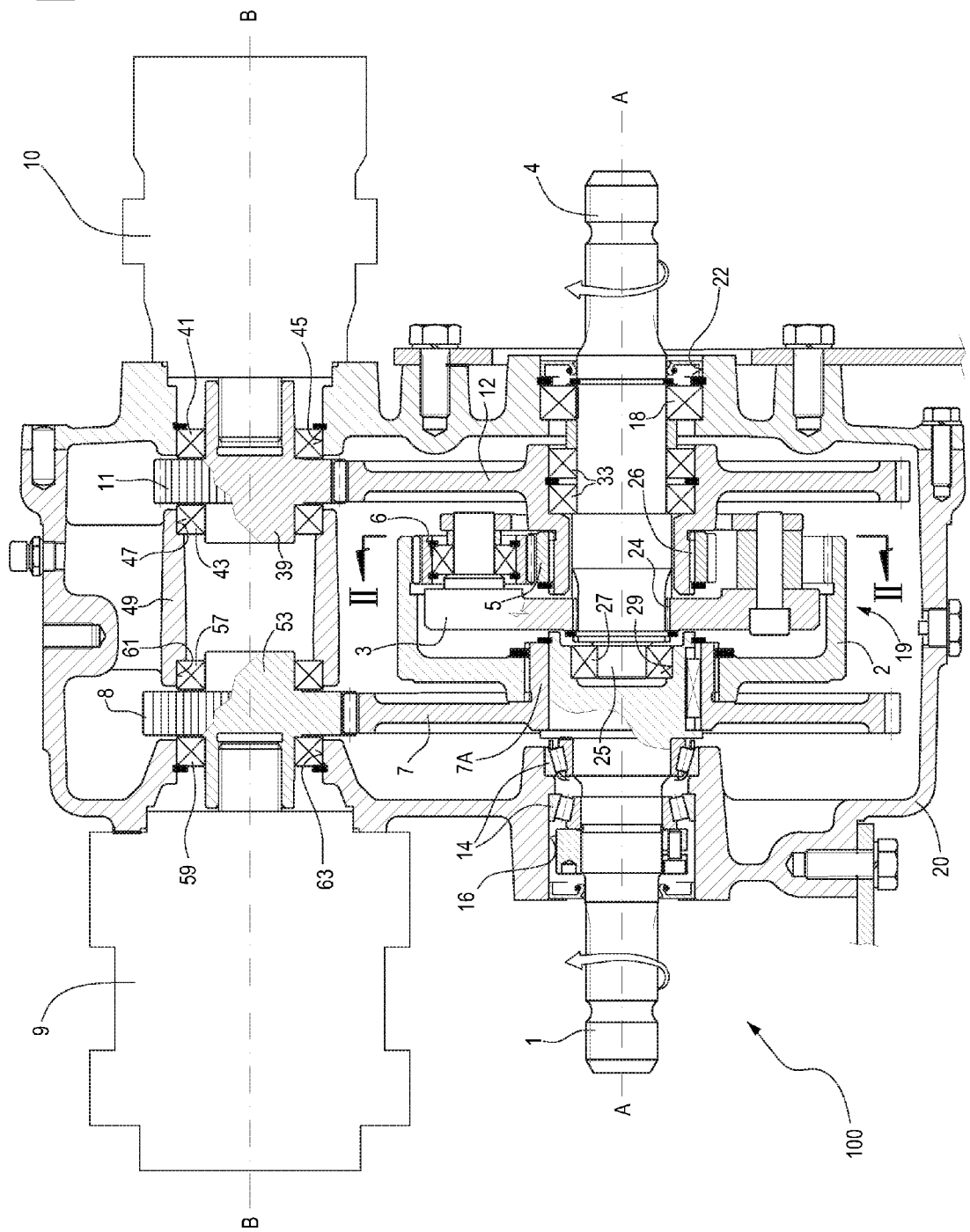
FIG. 1 is a cross-section of a possible embodiment of a mechanical power transmission unit, according to a plane containing the support shafts for the gears contained therein.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

With initial reference to FIGS. 1 and 2, a first configuration is described below of one embodiment of a mechanical power transmission unit, indicated as a whole with number 100, which is part of a system comprising a mixer-wagon for preparing and distributing fodder and the related mechanical transmission.

The mechanical power transmission unit 100 comprises a box or housing 20, inside which gears are arranged for transmitting motion and reducing or multiplying the number of revolutions between a first shaft 1 and a second shaft 4. In the illustrated embodiment, splined portions of the shafts 1 and 4 project from the box 20, for mechanically coupling to outer mechanical members. It is also possible that one of the shafts 1 and 4, or both, are integrally housed in the box 20 and accessible from the outside, for example through openings provided in the box 20. In this case, the shafts 1 and 4 may have axial holes with inner spline for coupling to outer shafts of mechanical members couplable to the mechanical power transmission unit 100.

The first shaft 1 and the second shaft 4 are coaxial. A-A indicates the common axis of the two shafts 1 and 4.

As it will be clearly apparent from the description below of various configurations of the mechanical power transmission unit 100, the shaft 1 may act as a drive shaft and the shaft 4 may act as a driven shaft or vice versa, based on whether the mechanical power transmission unit 100 is used as a reduction gear or as a multiplier of the number of revolutions.

Figure 2:
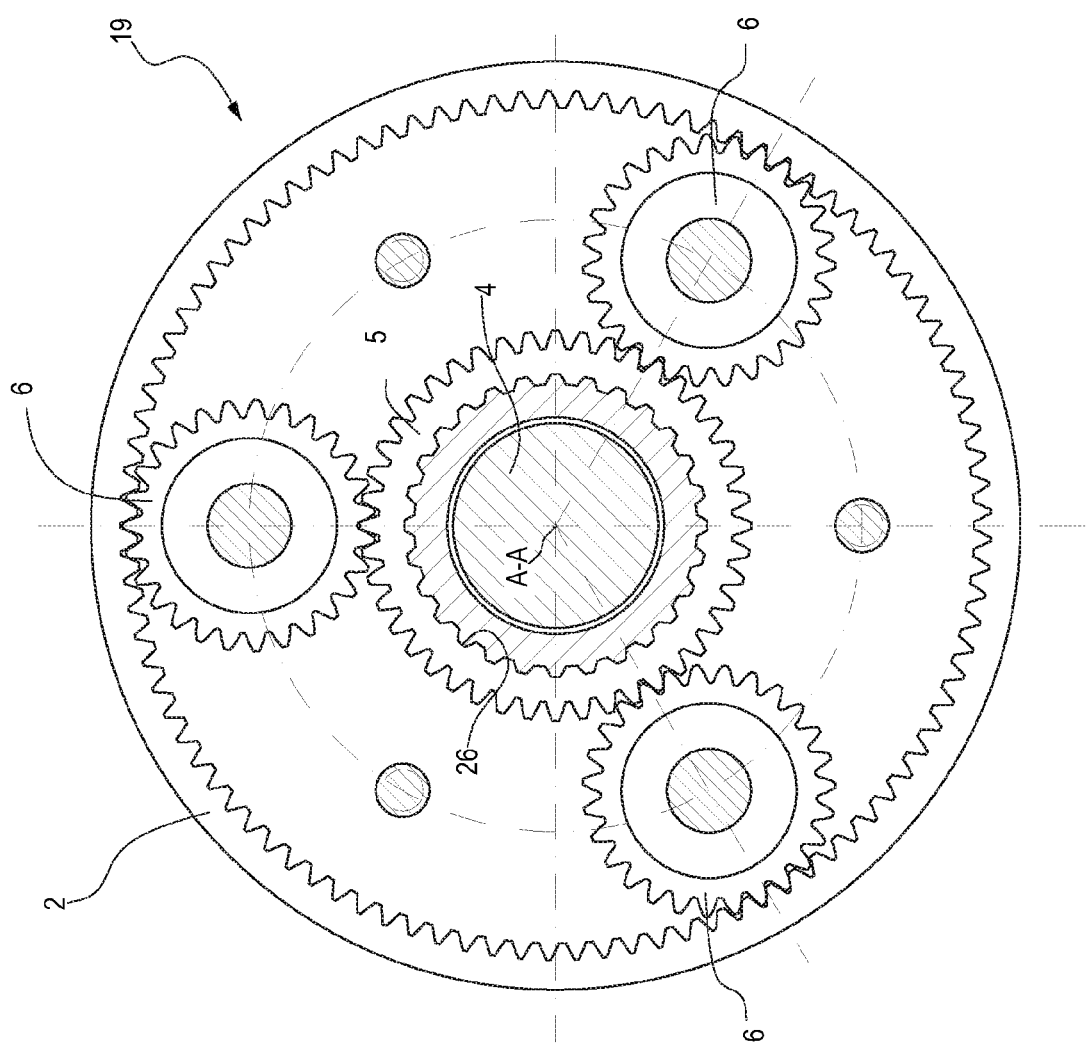
FIG. 2 is a simplified view, according to line II-II of FIG. 1, of the gears of the epicyclical gear train.

In the configuration of the mechanical power transmission unit 100 illustrated in FIG. 1, the first shaft 1 acts as drive shaft, or input shaft, of the mechanical power transmission unit 100, while the second shaft 4 acts as driven shaft, or output shaft.

The mechanical coupling between the first shaft 1 and the second shaft 4 occurs by means of the following mechanical members. A ring gear 2, with inner toothing, of an epicyclical gear train 19 is torsionally coupled to the first shaft 1. The ring gear 2 integrally rotates with the first shaft 1. The epicyclical gear train further comprises a planet-carrier 3 torsionally coupled to the second shaft 4, so as to rotate integrally with it.

In some embodiments, the planet-carrier 3 is torsionally constrained to the second shaft 4 by means of a coupling 24 with male and female splined profiles.

The epicyclical gear train 19 further comprises a sun gear 5, meshing with one or more planet gears 6. In the illustrated embodiment, as shown in particular in the schematic view of FIG. 2, the epicyclical gear train 19 comprises three sun gears 6. Each sun gear 6 also meshes, in addition to the sun gear 5, with the ring gear 2. In FIG. 2, the planet-carrier 3 has been omitted for the sake of clarity of representation; only the gears of the epicyclical gear train 19 are shown in this figure.

As clearly apparent from what described above, assuming for example that the shaft 1 is used as drive shaft, or input shaft, the power is transmitted from the first shaft 1 to the second shaft 4 by means of the epicyclical gear train 19, through the ring gear 2, the planet gears 6 and the planet-carrier 3. The opposite occurs if the second shaft 4 is used as drive shaft, or input shaft, and the first shaft 1 is used as output shaft, or driven shaft.

The transmission ratio between the first shaft 1 and the second shaft 4 may be changed by acting on the rotation speed of the sun gear 5. In order to rotate the sun gear 5 in a controlled manner, or to keep it still, according to the value of the required transmission ratio obtainable through the mechanical power transmission unit 100, the members described below are also provided.

In the configuration of FIG. 1, a gear 7 is torsionally coupled to the first shaft 1, so as to rotate integrally therewith at the same angular speed of the first shaft 1 and of the ring gear 2. The gear 7 meshes with a second gear 8 of smaller diameter. The rotation of the first shaft 1 is transmitted to a pump 9 through the pair of gears 7, 8. The pump may be a variable-displacement pump, known per se and being part of a hydrostatic transmission, the other components whereof are described below.

The pump 9 is connected to a hydraulic motor 10 through a (closed or open) hydraulic circuit not shown in FIG. 1. The motion transmitted to the pump 9 by means of the pair of gears 7, 8 causes working fluid, for example oil, to circulate from the pump 9 to the hydraulic motor 10, and from this latter to the pump again. The rotation speed of the pump 9 is proportional to the speed of the first shaft 1, wherein the speed ratio is given by the transmission ratio between the gears 7 and 8. Vice versa, the speed of the hydraulic motor 10 is variable with respect to the rotation speed of the first shaft 1, and can be controlled by acting on the displacement of the pump 9 and, thus, on the flow rate of the working fluid. The variable-displacement pump 9 may be also controlled so as to reverse the flow in the circuit connecting the hydraulic motor 10 to the pump 9, i.e. so as to reverse the rotation speed of the hydraulic motor 10, which can consequently rotate clockwise or counterclockwise.

Instead of a variable-displacement pump 9, a variable-displacement hydraulic motor 10 may be provided with the same function. It is also possible to use a variable-displacement pump 9 and a variable-displacement hydraulic motor 10 in combination.

Generally speaking, the hydrostatic transmission, comprising the pump 9 and the hydraulic motor 10, is so configured that the rotation speed of the hydraulic motor 10 can vary independently of the rotation speed of the pump 9.

The hydraulic motor 10 transmits motion to an exit gear 11 meshing with a gear 12 idly supported on the second shaft 4 and torsionally coupled to the sun gear 5.

Therefore, the hydrostatic transmission comprising the pump 9, the hydraulic motor 10, the hydraulic circuit connecting the pump 9 and the hydraulic motor 10, as well as the pairs of gears 7, 8 and 11, 12 allows to rotate the sun gear 5 at controlled speed.

By acting on the displacement of the pump 9 (or of the hydraulic motor 10), and thus on the flow rate of the working liquid, it is possible to vary the rotation speed and direction of the sun gear 5. If the hydrostatic transmission is controlled so that the hydraulic motor 10 remains still, the sun gear 5 remains blocked with respect to the box 20 and the transmission ratio between the first shaft 1 and the second shaft 4 is defined by the number of teeth of the gears forming the epicyclical gear train 19. In order to modify the transmission ratio, it is necessary to act on the flow rate of working liquid circulating in the hydrostatic transmission, driving into rotation the sun gear 5 in the desired direction and at the required angular speed. Numeric examples of various operating modes of the mechanical power transmission unit 100 will be provided below.

The pump 9 may be configured so as to make the hydraulic motor 10 rotate selectively in clockwise or in counterclockwise direction, and therefore so as to make the sun gear 5 rotate with respect to the box 20 in the same direction or in opposite direction with respect to the ring gear 2 and to the shafts 1 and 4. This can be achieved by acting on the mechanical members regulating the displacement of the pump 9. When the rotation direction of the sun gear 5 is the same as the rotation direction of the ring gear 2, the rotation speed of the planet-carrier 3 increases, and therefore the speed of the second shaft 4 with respect to the conditions when the sun gear 5 is still. Vice versa, if the sun gear 5 rotates in a direction opposite to the rotation direction of the ring gear 2, the rotation speed of the planet-carrier 3, and therefore of the second shaft 4, decreases with respect to the speed when the sun gear 5 is stationary.

In any case, the rotation direction of the two coaxial shafts 1 and 4 remains the same: both the first shaft 1 and the second shaft 4 rotate in clockwise direction, or in counterclockwise direction.

More construction details of the mechanical power transmission unit 100 briefly described above will be described below in greater detail, with reference to FIGS. 1 and 2 again.

The first shaft 1 may be supported by means of one or more bearings 14, for example a pair of roller bearings mounted in an X-like manner to support both radial and axial loads. The bearings 14 may be housed in a seat 16 provided in the box 20.

The second shaft 4 may be supported by means of one or more bearings 18, for example rolling bearings. In the illustrated embodiment, a single ball bearing 18 is provided, housed in a respective seat 22 provided in the box 20.

In advantageous embodiments, the second shaft 4 extends towards the first shaft 1, beyond the grooved profile 24 coupling the planet-carrier 3 and the second shaft 4. Number 25 indicates an end shank of the second shaft 4 engaging an axial seat 29 of the first shaft 1 by means of a bearing 27. In this way, the inner end of the second shaft 4 is supported by the first shaft 1. The planet-carrier 3 is housed inside the ring gear 2, so that the axial dimension of the set formed by the ring gear 2, the planets 6 and the planet-carrier 3 is equal to the axial dimension of the ring gear 2.

In the illustrated embodiment, the sun gear 5 is torsionally coupled to the gear 12 through a splined coupling 26, while the gear 12 may be supported through bearings 33 on the second shaft 4, so that the second shaft 4 and the sun gear 5 can freely rotate with respect to one another around the common axis A-A. In less advantageous embodiments, the sun gear 5 may be integral with the gear 12.

The gear 11 is torsionally coupled, for instance keyed, on an auxiliary drive shaft 39. In other embodiments, the gear 11 may be integral with the auxiliary drive shaft 39, which receives motion from the hydraulic motor 10. In the configuration of FIG. 1, the auxiliary drive shaft 39 is mounted rotatable on the box 20 by means of two bearings 41, 43 spaced from one another, the gear 11 being arranged between the two bearings. The bearing 41 is mounted in a seat 45 provided in the outer wall of the box 20, while the bearing 43 is mounted in a seat 47 provided in an annular element 49 inside the box 20 and integral therewith, for example molded with a main body of the box 20.

The diameter of the gear 12 is greater than the diameter of the gear 11, so that the rotation speed of the auxiliary drive shaft 39 is transmitted to the sun gear 5 with such a reduction ratio that the sun gear 5 rotates at an angular speed substantially lower than the angular speed of the auxiliary drive shaft 39.

B-B indicates the axis of the auxiliary drive shaft 39. In the illustrated embodiment, the axis B-B is parallel to the axis A-A of the first shaft 1 and the second shaft 4. The hydraulic motor 10 may also have a different orientation, for example with an output shaft orthogonal to the axis A-A. In this case, the gears 11, 12 may be conical. The orientation of the auxiliary drive shaft 39 with respect to the axis A-A of the first shaft 1 and of the second shaft 4 may be chosen according to construction and economical needs, for example in order to reduce the dimensions of the mechanical power transmission unit 100.

In the illustrated embodiment, the gear 8 transmitting motion to the pump 9 is keyed on an actuating shaft 53 of the pump 9, or formed integrally therewith. The actuating shaft 53 may be oriented parallel to the axis A-A of the first shaft 1 and the second shaft 4, and may be coaxial with the auxiliary drive shaft 39, as illustrated in the embodiment shown in the attached drawing. This is however not necessary. The orientation with respect to the other members of the mechanical power transmission unit 100 may be different than that illustrated, if necessary by using conical gears 7 and 8, so that the actuating shaft 53 of the pump 9 has an orientation orthogonal to the axis A-A.

In possible embodiments, the actuating shaft 53 of the pump 9 may be supported in the box 20 by means of a pair of bearings 57, 59. The first bearing 57 may be mounted in a seat 61 provided inside the box 20, for example in the annular element 49. The bearing 59 may be mounted in a seat 63 provided in the outer wall of the box 20.

In the embodiment illustrated in FIG. 1, the gear 7 is integral with a hollow cylindrical body 7A forming internally a torsional coupling with the first shaft 1, for instance by means of a key. Externally, the hollow cylindrical body 7A forms a torsional coupling with the ring gear 2, for example through splined profiles. In this way, the gear 7, the ring gear 2 and the first shaft 1 rotate integrally at the same angular speed around the axis A-A.

Through an electronic control system for controlling the hydrostatic transmission comprising the pump 9, the hydraulic motor 10 and the hydraulic circuit connecting the pump 9 to the hydraulic motor 10, it is possible to fully control the mechanical power transmission unit 100. In particular, it is possible to continuously vary the output rate of the mechanical power transmission unit 100 without varying the input rate. This allows, for example, to use an endothermic engine, such as a diesel engine, to actuate a driven machine through the mechanical power transmission unit 100, operating the endothermic engine at its optimal speed, thus reducing the fuel consumption, while the speed of the driven machine may vary within a range according to the features of the hydrostatic transmission comprising the pump 9 and the hydraulic motor 10.

Figure 5:
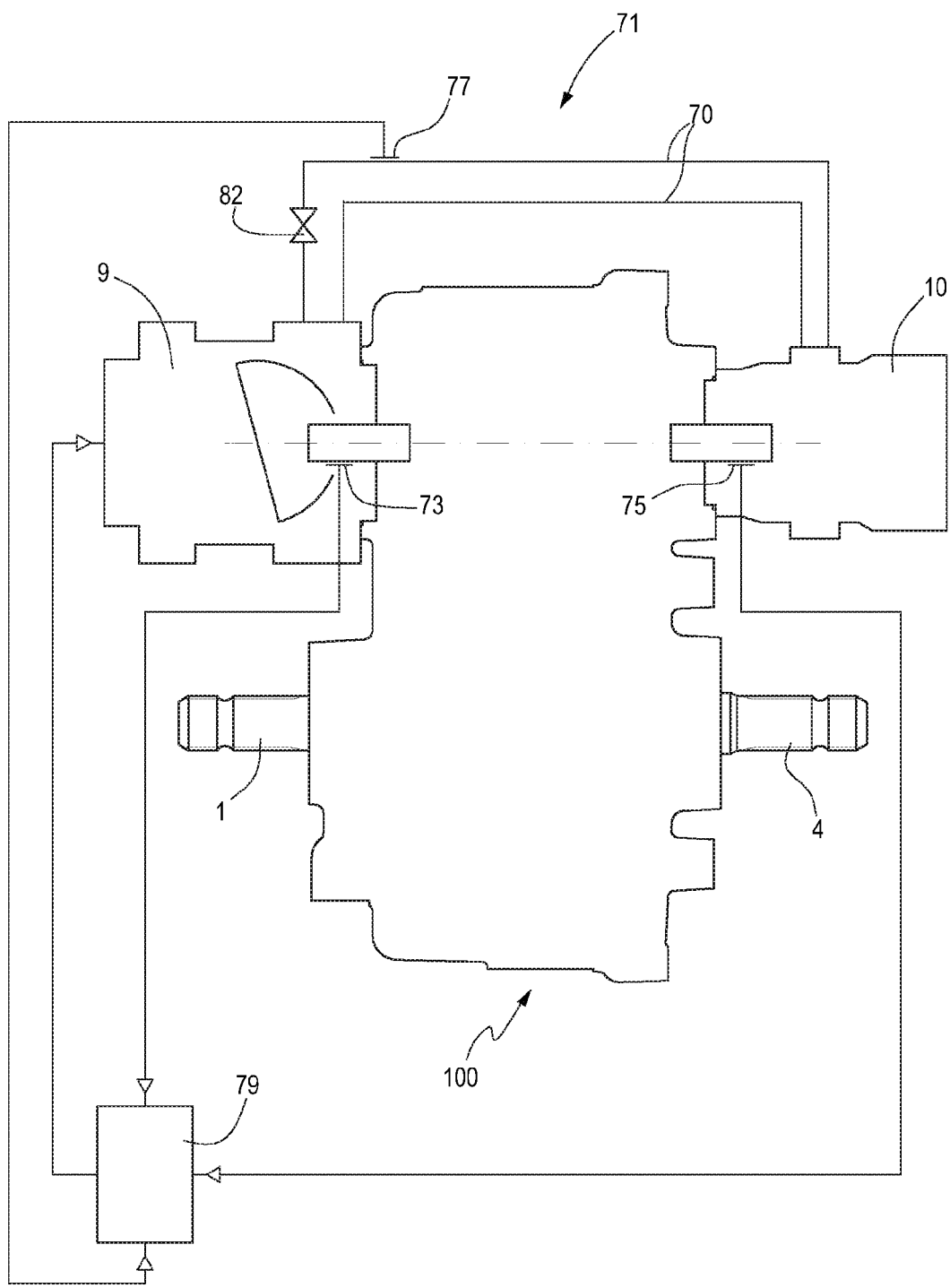
FIG. 5 is a regulation scheme of the mechanical power transmission unit comprising a hydrostatic transmission to adjust the transmission ratio.

FIG. 5 schematically shows a system comprising the mechanical power transmission unit 100 provided with hydrostatic transmission and the main components of a possible control system. The mechanical power transmission unit 100 comprises the pump 9 and the hydraulic motor 10 that form, together with a hydraulic circuit schematically indicated with 70, the hydrostatic transmission indicated as a whole with number 71. The system may further comprise a sensor 73 for detecting the rotation speed of the pump 9, a sensor 75 for detecting the rotation speed of the hydraulic motor 10, one or more pressure sensors 77 for detecting the pressure in the circuit 70. The sensors 73, 75, 77 are connected to an electronic central control unit 79. This latter is also connected to the pump 9, that comprises an actuator (not shown) for varying the displacement of the pump 9. Through the electronic central control unit 79 it is therefore possible to modify the displacement of the pump 9, and therefore the transmission ratio of the mechanical power transmission unit 100.

Through the speed of the pump 9 and of the hydraulic motor 10 it is possible to calculate the rotation speed of the output shaft (for instance the shaft 4) by knowing the rotation speed of the input shaft (for example the shaft 1). Through the pressure value in the closed circuit 70 it is possible to estimate or to calculate the output torque of the mechanical power transmission unit 100. By knowing the value of the transmitted torque it is possible to control the work load of the driven machine connected to the second shaft 4, and to manage it avoiding excessive loads.

Maximum-pressure valves 82 in the closed circuit 70 may act, if adequately controlled, as torque limiter for the mechanical power transmission unit 100 and for the driven machine connected to it.

As can be clearly understood from FIG. 1, the power is transmitted from the input to the output directly through the epicyclical gear train 19, whose rotation axis A-A (i.e. the axis of the ring gear 2, of the planet-carrier 3 and of the sun gear 5) coincides with the axis A-A of the first shaft 1 and of the second shaft 4.

Figure 3:
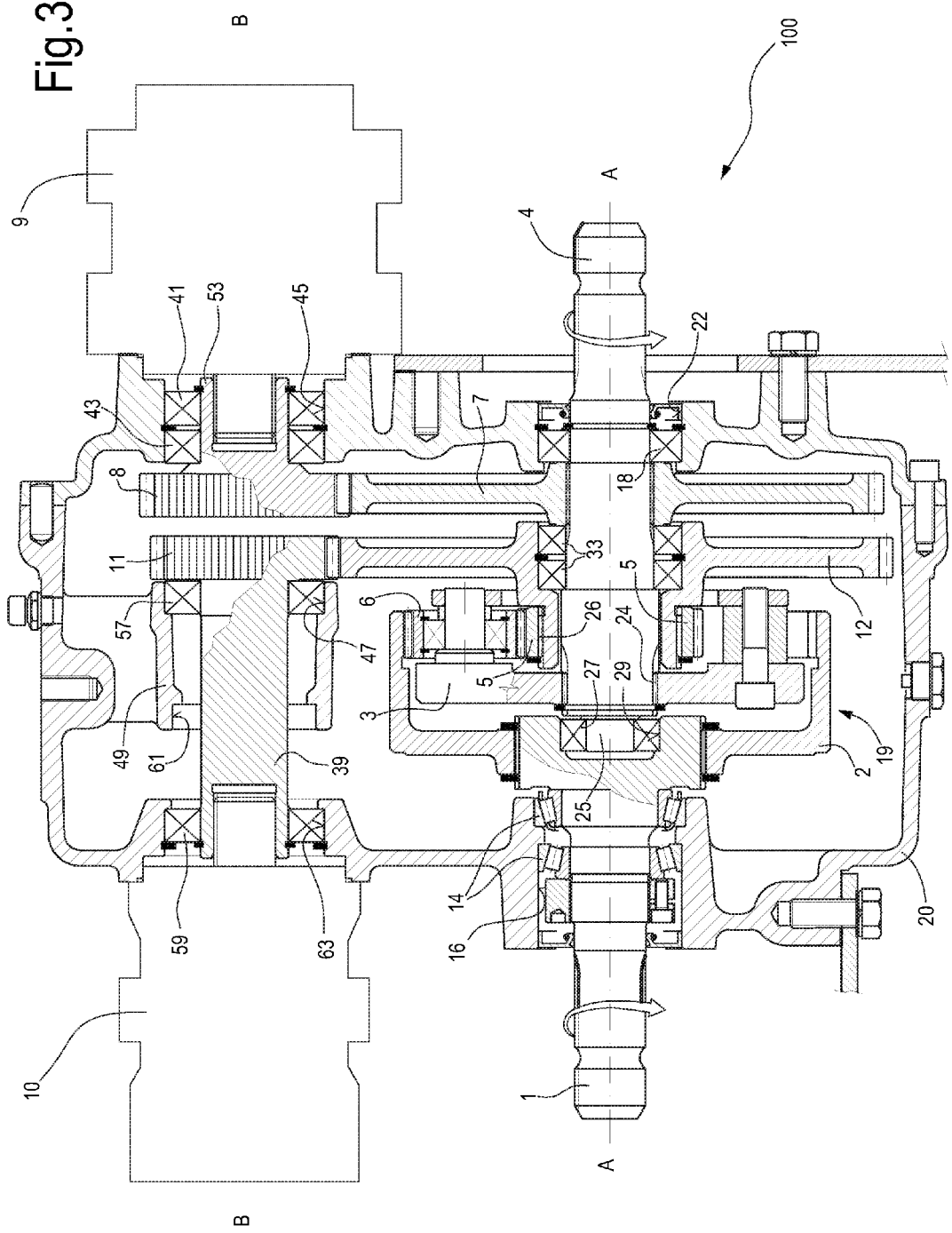
FIGS. 3 and 4 illustrate cross-sections similar to the cross-section of FIG. 1 of different embodiments of the mechanical power transmission unit of the invention.

While in the configuration of the above described FIG. 1 the mechanical power transmission unit is configured to act as a reduction gear, with the first shaft 1 acting as drive shaft and the second shaft 4 acting as output shaft, in other configurations the mechanical power transmission unit 100 may be used as multiplier. FIG. 3 illustrates a configuration of the mechanical power transmission unit 100 in this operation mode. The same numbers indicate identical or equivalent parts to those illustrated in FIG. 1. These parts will not be described again.

In the configuration of FIG. 3, the input shaft, or drive shaft, is the second shaft 4, while the first shaft 1 is the driven shaft, or output shaft. To take motion for the pump 9 from the drive shaft 4, it is possible in this case to reverse the positions of the pump 9 and of the hydraulic motor 10 and to use a longer auxiliary drive shaft 39 than the auxiliary drive shaft 39 of the configuration of FIG. 1. In this case, the auxiliary drive shaft 39 is supported by means of bearings 57 and 59 mounted in the seat 47 provided in the annular element 49 and in the seat 63 provided in the wall of the box 20. The gear 11 is mounted in a cantilevered manner on the auxiliary drive shaft 39.

The actuating shaft 53 of the pump 9 is supported by means of bearings 41 and 43 mounted in the seat 47 provided in the wall of the box 20 and the gear 8 is mounted in a cantilevered manner on the actuating shaft 53.

The gears 11 and 8 mesh again with respective gears 12 and 7 coaxial with the axis A-A of the shafts 1 and 4. However, differently from the configuration of FIG. 1, both gears 12 and 7 are arranged between the planet-carrier 3 and the bearing 18, i.e. at the same side of the epicyclical gear train 19. More in particular, while the gear 12, integral with the sun gear 5, is in the same position as in FIG. 1, the gear 7 is arranged between the gear 12 and the side wall of the box 20.

The operation of the mechanical power transmission unit 100 in the configuration of FIG. 3 is equal to that of the configuration of FIG. 1, with the difference that the input power is applied to the second shaft 4, acting as the drive shaft, while the output power is on the first shaft 1, acting as the output shaft, and the transmission ratio is such that the speed of the output shaft 1 is greater than the speed of the drive shaft 4.

Analogously to what described above, the transmission ratio may be modified by acting on the pump 9 and the hydraulic motor 10 of the hydrostatic transmission, so as to rotate the sun gear 5 in one direction or in the opposite direction and at controlled and adjustable speed through the hydraulic motor 10.

In the embodiments described above, the mechanical power transmission unit 100 comprises both a hydraulic motor 10 and a pump 9. However, this is not strictly necessary.

Figure 4:
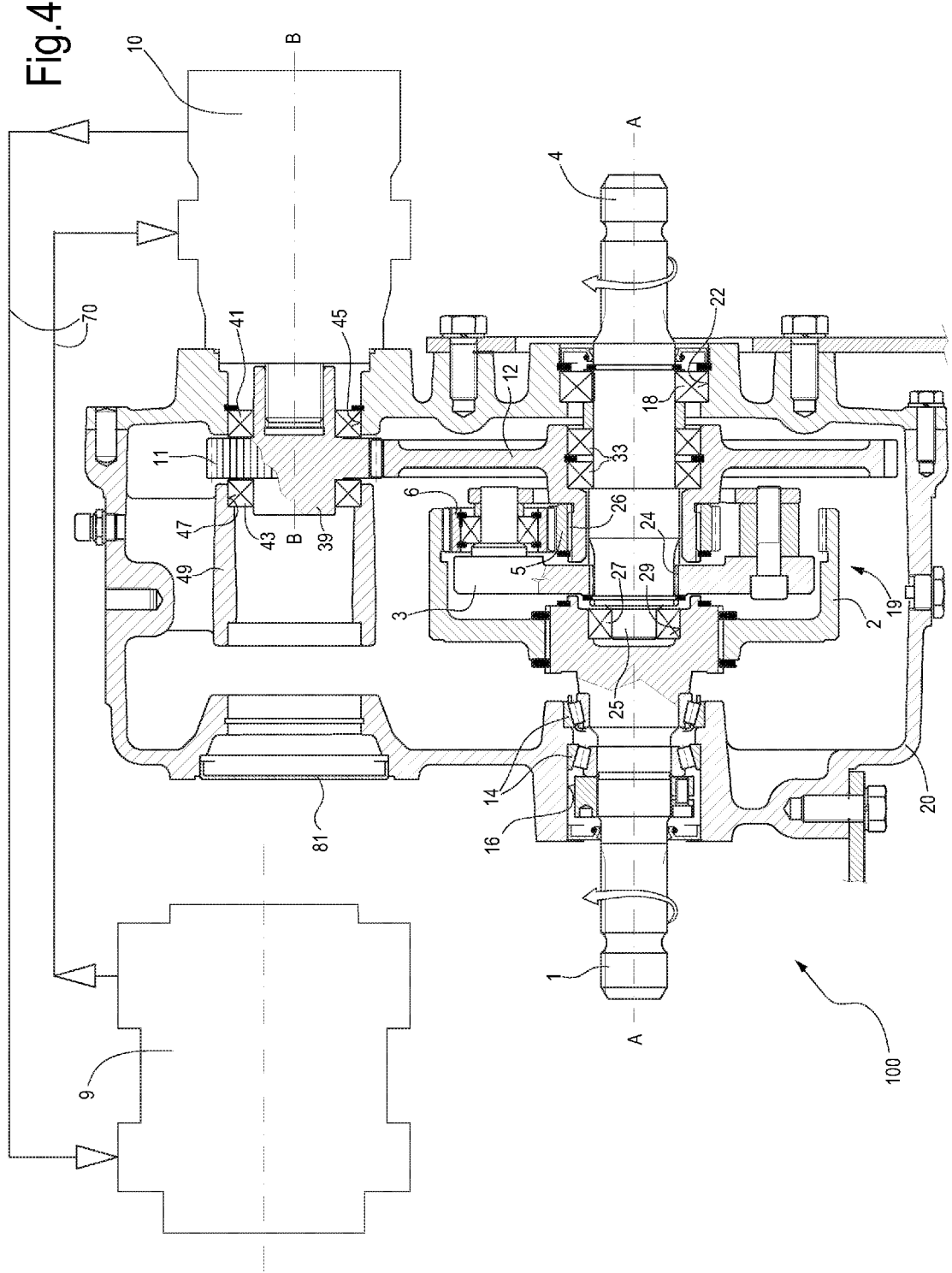

In alternative embodiments, the pump 9 may be external with respect to the mechanical power transmission unit 100. For example, a pump may be used available on a tractor or other machine, with which the mechanical power transmission unit 100 may interface. FIG. 4 schematically shows a configuration of this type, wherein the pump 9 is separated with respect to the mechanical power transmission unit 100 and is hydraulically coupled to the motor 10 through the hydraulic circuit schematically indicated with 70. A lid 81 closes the opening of the box 20, in correspondence of which the pump 9 is usually flanged, when this latter is part of the mechanical power transmission unit 100 and is carried by the box 20.

The gears 8 and 7, as well as the actuating shaft 53 of the pump 9 and the respective support bearings are not necessary and they are therefore not provided in the arrangement of FIG. 4. The remaining parts of the mechanical power transmission unit 100 are equal to those illustrated in FIG. 1, are indicated with the same reference numbers and will be not described again. In the configuration of FIG. 5, the mechanical power transmission unit 100 may act as multiplier or reduction gear, according to whether the drive shaft is the second shaft 4 or the first shaft 1 respectively.

The following tables show examples of two different configurations of the mechanical power transmission unit 100 according to what described above.

By assuming to combine a hydrostatic transmission (hydraulic motor 10 and pump 9) allowing the following features:
   speed of the hydraulic motor=−3000÷3000 rpm
   transmission ratio between motor 10 and sun gear=3
the following operation modes are possible:
   Operation as Reduction Gear (FIG. 1)

| Component of the unit | Speed [rpm] | | |
|---|---|---|---|
| drive shaft (1) | 1000 | 1000 | 1000 |
| hydraulic motor (10) | −3000 | 0 | 3000 |
| ring gear (2) | 1000 | 1000 | 1000 |
| sun gear (5) | −1000 | 0 | 1000 |
| planet-carrier (3) | 334 | 667 | 1000 |
| output shaft (4) | 334 | 667 | 1000 |
| transmission ratio (input/output) | 3 | 1.5 | 1 |

Operation as Multiplier (FIG. 3)

| Component of the unit | Speed [rpm] | | |
|---|---|---|---|
| drive shaft (4) | 1000 | 1000 | 1000 |
| hydraulic motor (10) | −3000 | 0 | 3000 |
| planet-carrier (3) | 1000 | 1000 | 1000 |
| sun gear (5) | −1000 | 0 | 1000 |
| ring gear (2) | 1000 | 1500 | 2000 |
| output shaft (1) | 1000 | 1500 | 2000 |
| transmission ratio (input/output) | 1 | 0.667 | 0.5 |

The mechanical power transmission unit 100 described above may have many applications in different mechanical sectors. Particularly, a system, is described, and forms a specific aspect of the present invention, which comprises a combination of a mixer-wagon for preparing and distributing fodder to animals, and a mechanical power transmission unit 100 in one of the embodiments described above. As mentioned in the introductory part of the present description, the operation of the mixer-wagon is subdivided into three main steps:
   the step of loading and mixing fodder;
   the step of moving, necessary to achieve the cowshed;
   the step of distributing fodder to animals.

These steps require different work speeds. The loading and mixing step requires medium speeds, variable according to the type and quantity of fodder to be mixed. The moving step occurs once the right mixing has been obtained, and requires very low speeds, to avoid the conglomeration of the material. The distributing step requires high speeds, increasing as the mixer-wagon empties.

The problems described above with regard to the actuating of a mixer-wagon are solved by using a mechanical power transmission unit 100 of the type described herein, interposed between the drive shaft of a tractor or other power source and the output shaft of the mixer-wagon.

FIGS. 6 and 7 schematically illustrate a system 200 comprising a mechanical power transmission unit 100 according to anyone of the embodiments described above and a mixer-wagon 202. In the present description and in the attached claims, mixer-wagon means any wagon suitable to receive fodder for animals, to mix it, if necessary to chop it or to process it in any other way, to transport it to the cowshed and to distribute it to animals. Therefore, the term mixer-wagon also comprises, for example, a silage cutter, a total mixed ration wagon, or any other machine suitable to receive one or more components for preparing food for animals and for distributing it. The mixer-wagon may have one or more augers, with vertical or horizontal axes, with or without silo-unloader means.

In the embodiment illustrated in FIGS. 6 and 7 just by way of example, the mixer-wagon 202 has two augers with vertical axes. In the illustrated example the mixer-wagon 202 comprises a tank 201, inside which two augers 203, 205 are arranged rotating around a vertical axis A-A and B-B respectively. The mixer-wagon further comprises a door 207, which can be opened to unload the fodder. To the door 207 a conveyor 209 is associated, transporting the fodder ejected from the tank 201 through the door 207 open towards the manger in the distribution step.

The mixer-wagon 202 comprises a frame 211 with coupling means 213 for coupling to a tractor, not shown.

215 indicates as a whole a shaft line from an input 215A, configured to be mechanically coupled to the power take off of the tractor, towards the augers 203 and 205. The shaft line 215 comprises the mechanical power transmission unit 100 and a series of universal transmissions, i.e. of shaft portions with universal joints. More in particular, a first universal transmission or shaft portion 217 couples the input 215A of the shaft line 215 to the input of the mechanical power transmission unit 100. A second universal transmission or shaft portion 219 connects the output of the mechanical power transmission unit 100 to an actuating box 223 of the mixing auger 203, and a third universal transmission or shaft portion 221 connects the actuating box 223 of the first mixing auger 203 to a second actuating box 225 of the second auger 205.

By suitably selecting the ratios of the epicyclical gear train 19 of the mechanical power transmission unit 100, for instance according to what described above, it is possible to obtain a transmission allowing:

to have slow start-up speed and therefore limited torque peaks;

to vary the work speed of the mixer-wagon 202 in a continuous and not-discrete manner, without interrupting the rotation of the augers 203 and 205;

to select the most suitable chopping speed for each type of material and condition, thus allowing a more homogeneous product;

to vary the chopping speed of the augers 203 and 205 independently of the rotation speed of the endothermic engine of the tractor, thus optimizing and reducing the fuel consumption;

to have low speed during the moving step, allowing a limited fuel consumption and avoiding to restart the mixer-wagon when it is full;

to have high distribution speeds variable according to the quantity of material in the tank 201 of the mixer-wagon 202, so that it is not necessary to modify the speed of the tractor to have a uniform distribution of fodder in the manger;

to eliminate the dead times due to gear changing, stops and restarts of the machine;

to eliminate the dead times due to the intervention of the torque limiters at full-load restarts.

Through suitable electronic management (for instance by means of the central control unit 79) of the pump 9 mounted on the mechanical power transmission unit 100 it is possible to optimize the operation of the system 200 to obtain:

a better quality of the mixed product;
a reduction in fuel consumption;
a reduction in work times;
a general improvement of the work comfort as the system can gradually adapt to the sudden power changes that can be generated during the work steps, in particular during the loading step and the start.

The embodiments described above use a hydraulic motor 10 actuated by a variable-displacement pump 9 to modify the transmission ratio of the epicyclical gear train. This solution is particularly advantageous, as it uses only mechanical power available for example from a power take off of a tractor or other machine.

However, in other embodiments it is also possible to use a different system to modify the transmission ratio of the mechanical power transmission unit 100, for example a system using a different power source to drive the sun gear 5 into rotation. To this end, in some embodiments an electric motor, with electronic control of the rotation speed, may be used.

It is also possible to use a hydrostatic transmission, wherein the pump 9 is actuated by means of an electric motor. In this case, the rotation speed of the sun gear 5 may be controlled by acting on the speed of the electric motor. Therefore, the electronic management of the transmission ratio occurs through electronic control of the electric motor driving the pump 9 into rotation.

In the description above reference has been made to a hydrostatic transmission system with a hydraulic motor 10 and a variable-displacement pump 9. It is also possible to use a variable-displacement hydraulic motor 10 to adjust the rotation speed of the sun gear 5. The variable-displacement hydraulic motor may be used in combination with a fixed-displacement pump or with a variable-displacement pump. In this case, the central control unit 79 may act on the variable-displacement motor, or on both the variable-displacement motor and the variable-displacement pump.

While the particular embodiments of the invention described above have been shown in the drawing and described integrally in the description above with features and characteristics relating to different example embodiments, those skilled in the art will understand the modifications, changes and omissions are possible without however departing from the innovative learning, the principles and the concepts described above and the advantages of the object described in the attached claims. Therefore, the scope of the described improvements shall be determined only based upon the widest interpretation of the attached claims, so as to include all the modifications, changes and omissions. Furthermore, the order or sequence of any step of method or process may be changed according to alternative embodiments.

What is claimed is:

1. A system comprising:
   a mixer-wagon and a shaft line for transmitting power to rotating members of the mixer-wagon; and
   a mechanical power transmission unit arranged along the shaft line, wherein the mechanical power transmission unit comprises:
   a box;
   a first power input shaft accessible from the outside of the box;
   a second power output shaft accessible from the outside of the box;
   an epicyclical gear train between the first shaft and the second shaft, the epicyclic gear train comprising:
   a ring gear;
   a sun gear coaxial with the ring gear;

at least one planet gear meshing with the ring gear and the sun gear and carried rotating by a planet-carrier coaxial with the sun gear and the ring gear, the ring gear being torsionally constrained to the first shaft and the ring gear being coaxial with the first shaft, the planet-carrier being torsionally constrained to the second shaft and the planet-carrier being coaxial with the second shaft;

a variable speed motion source configured to modify the rotation speed of the sun gear around the axis thereof in order to modify the gear ratio between the first shaft and the second shaft, the variable speed motion source comprising a hydraulic motor connected to a first gear;

a pump arranged collinear with the hydraulic motor, the pump being connected to a second gear, at least one of the first gear and the second gear being connected to an annular element, the annular element being collinear with the pump and the hydraulic motor, wherein at least one bearing is connected to the annular element for collinear rotation of the at least one of the first gear and the second gear.

2. A system according to claim 1, wherein the rotating members of the mixer-wagon comprise at least one auger, preferably driven in rotation by means of a control box.

3. A system according to claim 1, wherein the second shaft, to which the planet-carrier is torsionally coupled, extends inside the sun gear and the planet-carrier is arranged between the sun gear and the first shaft.

4. A system according to claim 1, wherein the variable speed motion source is configured so as to modify the rotation speed of the sun gear around the axis thereof, in order to modify the gear ratio between the first shaft and the second shaft.

5. A system according to claim 1, wherein said motion source is part of a hydrostatic transmission.

6. A system according to claim 1, further comprising an auxiliary drive shaft, mechanically connected to the motion source and a transmission between the auxiliary drive shaft and the sun gear of the epicyclical gear train, wherein a change in the rotation speed of the auxiliary drive shaft causes a change in the gear ratio between the first shaft and the second shaft.

7. A system according to claim 6, wherein the mechanical transmission between the auxiliary drive shaft and the sun gear comprises a first toothed wheel that is torsionally constrained to the auxiliary drive shaft and a second toothed wheel that engages the first toothed wheel and is torsionally constrained to the sun gear of the epicyclical gear train.

8. A system according to claim 6, wherein the auxiliary drive shaft is substantially parallel to the first shaft and the second shaft.

9. A system according to claim 1, wherein the motion source comprises a hydraulic motor.

10. A system according to claim 9, further comprising a hydraulic circuit connecting the pump and the hydraulic motor, wherein the pump supplies an operating fluid to the hydraulic motor in order to drive the hydraulic motor into rotation; and wherein preferably at least one of said hydraulic motor and said pump has a variable displacement, the variable displacement causing the change in the transmission ratio of the mechanical power transmission unit.

11. A system according to claim 10, wherein the pump is mechanically coupled to one of said first shaft and second shaft, so as to receive the motion from the shaft line of the mixer-wagon.

12. A system according to claim 11, wherein the pump is mechanically coupled to said first shaft and second shaft acting as a drive shaft for the mechanical power transmission unit.

13. A system according to claim 11, wherein the pump is mechanically coupled to one of the first shaft and the second shaft by the first gear and another gear to define a pair of gears, one of which is torsionally coupled to an actuating shaft for actuating the pump and the other one is coupled to said first shaft or second shaft, to which the pump is mechanically coupled.

14. A system according to claim 13, wherein the actuating shaft for the pump is substantially parallel to the first shaft and the second shaft.

15. A system according to claim 14, wherein the actuating shaft for the pump is substantially coaxial with the auxiliary drive shaft.

16. A system according to claim 13, wherein the box comprises a plurality of seats for bearings supporting the auxiliary drive shaft and the actuating shaft for the pump, the seats being substantially coaxial with one another, and at least some of the seats being arranged inside the box in an intermediate position between seats provided in outer walls of the box.

17. A system according to claim 1, further comprising an electronic central control unit configured and arranged so as to control the rotation speed of the motion source and, consequently, the transmission ratio between the first shaft and the second shaft of the mechanical power transmission unit.

18. A system according to claim 10, further comprising an electronic central control unit configured and arranged so as to control the variable displacement of said hydraulic motor and/or of said pump and, consequently, the transmission ratio between the first shaft and the second shaft of the mechanical power transmission unit.

19. A system according to claim 1, wherein the second shaft extends towards the first shaft, beyond a grooved profile coupling the planet-carrier and the second shaft to one another, the second shaft comprising an end shank, the end shank engaging an axial seat of the first shaft by a bearing such that the end of the second shaft is supported by the first shaft, the planet-carrier being housed inside the ring gear.

20. A system comprising:
a mixer-wagon and a shaft line for transmitting power to rotating members of the mixer-wagon; and
a mechanical power transmission unit arranged along the shaft line, the mechanical power transmission unit comprising:
a box;
an input shaft accessible from outside of the box;
an output shaft accessible from the outside of the box;
an epicyclical gear train between the input shaft and the output shaft, the epicyclic gear train comprising:
a ring gear;
a sun gear coaxial with the ring gear;
a planet carrier;
a planet gear meshing with the ring gear and the sun gear, the planet gear being connected to the planet-carrier such that the planet gear is rotatable, the planet-carrier being coaxial with the sun gear and the ring gear, the ring gear being fixed to the input shaft such that the ring gear rotates based on rotation of the input shaft, the ring gear being coaxial with the input shaft, the planet-carrier being fixed to the output shaft such that the planet carrier rotates based on rotation of the output shaft, the planet-carrier being coaxial with the output shaft;

a first gear rotatable about a first gear axis;

a second gear rotatable about a second gear axis, the first gear axis being aligned with the second gear axis;

an annular element;

a bearing, at least a portion of the bearing being seated in the annular element;

a variable speed motion source configured to modify the rotation speed of the sun gear around the axis thereof in order to modify the gear ratio between the input shaft and the output shaft, the variable speed motion source comprising a hydraulic motor connected to the first gear, the hydraulic motor comprising a hydraulic motor longitudinal axis;

a pump connected to the second gear, the pump comprising a pump longitudinal axis, the pump longitudinal axis being aligned with the hydraulic motor longitudinal axis.

21. A system according to claim 20, wherein the output shaft extends towards the input shaft, beyond a grooved profile coupling the planet-carrier and the output shaft to one another, the output shaft comprising an end shank, the end shank engaging an axial seat of the input shaft by a bearing such that the end of the output shaft is supported by the input shaft, the planet-carrier being housed inside the ring gear.

22. A system according to claim 20, wherein the output shaft comprises a output shaft end portion, the input shaft comprising a input shaft end portion, the input shaft end portion comprising a input shaft end portion space, the output shaft end portion being arranged in the input shaft end portion space.

23. A system according to claim 22, wherein the ring gear comprises a ring gear interior space, at least a portion of the planet-carrier being arranged in the ring gear interior space.

* * * * *